(12) United States Patent
Shin et al.

(10) Patent No.: US 10,983,413 B2
(45) Date of Patent: Apr. 20, 2021

(54) BEAM STEERING DEVICE AND ELECTRONIC APPARATUS INCLUDING THE SAME

(71) Applicant: SAMSUNG ELECTRONICS CO., LTD., Suwon-si (KR)

(72) Inventors: Changgyun Shin, Anyang-si (KR); Junghyun Park, Seoul (KR); Dongjae Shin, Seoul (KR); Eunkyung Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 540 days.

(21) Appl. No.: 15/851,061

(22) Filed: Dec. 21, 2017

(65) Prior Publication Data
US 2019/0004394 A1    Jan. 3, 2019

(30) Foreign Application Priority Data

Jun. 30, 2017    (KR) .......................... 10-2017-0083609

(51) Int. Cl.
| | | |
|---|---|---|
| *G02F 1/31* | (2006.01) |
| *G02F 1/313* | (2006.01) |
| *G02F 1/295* | (2006.01) |
| *G01S 17/42* | (2006.01) |
| *G01S 7/481* | (2006.01) |

(52) U.S. Cl.
CPC .......... *G02F 1/3137* (2013.01); *G01S 7/4814* (2013.01); *G01S 7/4817* (2013.01); *G01S 17/42* (2013.01); *G02F 1/2955* (2013.01); *G02F 2203/24* (2013.01); *G02F 2203/50* (2013.01)

(58) Field of Classification Search
CPC .. G02F 1/3137; G02F 1/2955; G02F 2203/23; G02F 2203/50; G01S 7/4814; G01S 17/42
See application file for complete search history.

(56) References Cited

U.S. PATENT DOCUMENTS

| | | |
|---|---|---|
| 5,159,650 A | 10/1992 | Nishiwaki et al. |
| 5,233,673 A | 8/1993 | Vali et al. |

(Continued)

FOREIGN PATENT DOCUMENTS

| | | |
|---|---|---|
| KR | 10-0752362 B1 | 8/2007 |
| KR | 10-0762400 B1 | 10/2007 |
| KR | 10-0991121 B1 | 11/2010 |

OTHER PUBLICATIONS

Hutchison et al: "High-resolution aliasing-free optical beam steering", vol. 3, No. 8, Aug. 5, 2016, Optica, pp. 887-890, (4 pages total).

(Continued)

*Primary Examiner* — Hovhannes Baghdasaryan
(74) *Attorney, Agent, or Firm* — Sughrue Mion, PLLC

(57) ABSTRACT

A beam steering device includes an optical waveguide configured to split input light into a plurality of split light along a plurality of paths and output the plurality of split light to a plurality of output terminals which are aperiodically arranged, a plurality of phase shifters provided in the plurality of paths, wherein at least two phase shifters among the plurality of phase shifters have different phase delay length, and a signal input unit configured to supply a uniform signal to each of the plurality of phase shifters.

16 Claims, 10 Drawing Sheets

(56) References Cited

U.S. PATENT DOCUMENTS

| | | | |
|---|---|---|---|
| 2010/0046890 A1* | 2/2010 | Lee | G02B 6/125 385/45 |
| 2010/0290108 A1* | 11/2010 | Tokita | H01S 3/2316 359/345 |
| 2015/0338576 A1 | 11/2015 | Nomura | |
| 2015/0346340 A1* | 12/2015 | Yaacobi | G02F 1/292 356/5.11 |
| 2015/0378241 A1 | 12/2015 | Eldada | |
| 2016/0049765 A1 | 2/2016 | Eldada | |

OTHER PUBLICATIONS

Communication dated Oct. 9, 2018 issued by the European Patent Office in European counterpart European Application No. 18162931.2.

Rabinovich et al., "Two-dimensional beam steering using a thermo-optic silicon photonic optical phased array", Optical Engineering, vol. 55, No. 11, Nov. 2016, 8 pages total, XP060077697.

Komljenovic et al., "Sparse aperiodic arrays for optical beam forming and LIDAR", vol. 25, No. 3, Jan. 2017, 18 pages total, XP055475693.

Hulme et al., "Fully integrated hybrid silicon free-space beam steering source with 32 channel phased array", Proc. of SPIE, vol. 8989, 898907, Mar. 2014, 15 pages total, XP060035951.

Yaacobi et al., "Integrated phased array for wide-angle beam steering", Optics Letters, vol. 39, No. 15, Aug. 1, 2014, 4 pages total, XP55497363.

Poulton et al., "Large-scale silicon nitride nanophotonic phased arrays at infrared and visible wavelengths", Optics Letters, vol. 42, No. 1, Dec. 2016, 4 pages total, XP55510251.

Jarrahi et al., "Optical switching based on high-speed phased array optical beam steering", Applied Physics Letters, vol. 92, No. 1, Jan. 2008, 3 pages total, XP012105779.

* cited by examiner

BEAM STEERING DEVICE AND ELECTRONIC APPARATUS INCLUDING THE SAME

CROSS-REFERENCE TO RELATED APPLICATION

This application claims the priority from Korean Patent Application No. 10-2017-0083609, filed on Jun. 30, 2017 in the Korean Intellectual Property Office, the disclosure of which is incorporated herein in its entirety by reference.

BACKGROUND

1. Field

Example embodiments of the present disclosure relate to a beam steering device capable of controlling a direction of output light by differently modulating a phase of incident light according to a position of an optical path of the incident light, and an electronic apparatus including the same.

2. Description of the Related Art

Optical elements, which change a transmittance/reflectance, polarization, phase, intensity, path, etc. of incident light, have been used in various types of optical devices. Various types of optical modulators have been introduced to control the above-described properties of incident light in an optical system according to a desired manner.

A method of differently modulating the phase of incident light according to a position of an optical path of the incident light has been used to adjust a direction of output light. Such a phased array is referred to as an optical phased array (OPA). The OPA is capable of outputting light in a specific direction since constructive interference may occur in a specific direction. However, output light may be distorted in an unintended direction according to the distance between light emission arrays included in the OPA.

SUMMARY

One or more example embodiments provide a beam steering device that may more easily adjust a direction of output light and have high precision.

One or more example embodiment also provide an electronic apparatus employing the beam steering device.

According to an aspect of an example embodiment, there is provided a beam steering device including an optical waveguide configured to split input light into a plurality of split light along a plurality of paths, and output the plurality of split light to a plurality of output terminals which are aperiodically arranged, a plurality of phase shifters provided in the plurality of paths, wherein at least two phase shifters among the plurality of phase shifters have different phase delay length, and a signal input unit configured to supply a uniform signal to each of the plurality of phase shifters.

The phase delay length of each of the plurality of phase shifters may be set wherein a sum of phase delay lengths of one or more phase shifters provided in a path, from the plurality of paths, facing one of the plurality of output terminals correspond to the aperiodic arrangement of the plurality of output terminals and an steering angle of output light.

The optical waveguide may provide an optical path through which input light is split M times in a full binary tree structure, and has ($2^M$−1) split points and $2^M$ output terminals, wherein M is an integer greater than or equal to 1.

The beam steering device may further include a plurality of splitters configured to split input light into two branches of light, the plurality of splitters each being arranged on one of the ($2^M$−1) split points.

The beam steering device, wherein each of the plurality of splitters may be arranged at only one of two branches of each of the plurality of splitters.

The beam steering device, wherein, when a sum $L_1$ of phase delay length of one or more phase shifters provided in a path facing a first output terminal $OP_1$ is 0, a position $d_1$ of the first output terminal $OP_1$ is 0, and a position of an $i^{th}$ output terminal $OP_i$ is $d_i$, a sum $L_i$ of phase delay length of one or more phase shifters provided in an $i^{th}$ path among the plurality of paths facing an $i^{th}$ output terminal among the plurality of output terminals satisfies the following condition:

$$\sin\theta = \frac{\lambda c L_i}{2\pi d_i},$$

wherein $\lambda$ is a wavelength of incident light, $\theta$ is a steering angle, and c is a real number which is not 0, and wherein i is an integer from 1 to $2^M$.

The beam steering device, wherein a phase delay length of a phase shifter may be provided in an optical path which is an $M^{th}$ branch and facing an even-numbered output terminal $OP_{2k}$ among the plurality of output terminals is ($L_{2k}$−$L_{2k-1}$), wherein k represents an integer from 1 to $2^{M-1}$.

The beam steering device, wherein a phase delay length of a phase shifter provided at one of two branches of a splitter provided on a first split point may be $L_n$, wherein n=$2^M$+1.

The beam steering device, wherein the plurality of phase shifters may delay a phase of light passing through a predetermined region of the optical waveguide by changing a refractive index of the predetermined region according to an input signal.

The beam steering device, wherein the plurality of phase shifters may include heaters configured to be electrically heated to heat the predetermined region.

The beam steering device, wherein lengths of the heaters in directions of a plurality of optical paths may be proportional to the phase delay length of the plurality of phase shifters.

The beam steering device, wherein each of the plurality of phase shifters may include two electrodes configured to apply voltage to opposite ends of the predetermined region to change a carrier concentration of the predetermined region.

The beam steering device, wherein a length of one of the two electrodes of each of the plurality of phase shifters in a direction of an optical path may be proportional to the phase delay length of the phase shifter.

The beam steering device may further include a first optical amplifier configured to amplify an input optical signal, the first optical amplifier being provided at an input terminal of the optical waveguide, and second optical amplifiers configured to amplify an output optical signal and transmit the amplified output optical signal to the plurality of output terminals, the second optical amplifiers being provided between the plurality of output terminals and a plurality of splitters configured to split light.

The beam steering device may further include a light source configured to emit light toward the optical waveguide.

The beam steering device, wherein the light source, the optical waveguide, and the plurality of phase shifters may be integrated on one silicon substrate.

According to an aspect of an example embodiment, there is provided a light detection and ranging (LiDAR) device including a light source, a beam steering device configured to steer light from the light source at a predetermined angle and output the steered light, wherein the beam steering device includes an optical waveguide configured to split input light into a plurality of split light along a plurality of paths, and output the plurality of split light to a plurality of output terminals which are aperiodically arranged, a plurality of phase shifters provided in the plurality of paths, wherein at least two phase shifters among the plurality of phase shifters have different phase delay length, and a signal input unit configured to supply a uniform signal to each of the plurality of phase shifters, a receiver configured to receive the light which is output from the beam steering device and light reflected from an object, and a processor configured to control the light source, the beam steering device, and the receiver.

The LiDAR device, wherein the optical waveguide may be configured to provide an optical path through which input light is split M times in a full binary tree structure, and has $(2^M-1)$ split points and $2^M$ output terminals, wherein M represents an integer greater than or equal to 1, and the beam steering device may further include splitters configured to split the input light into two branches of light, the splitters each being arranged at one of the $(2^M-1)$ split points.

The LiDAR device, wherein, when a sum $L_1$ of length of phase delay by one or more phase shifters provided in a path facing a first output terminal $OP_1$ is 0, a position $d_1$ of the first output terminal $OP_1$ is 0, and a position of an $i^{th}$ output terminal $OP_i$ is $d_i$, a sum $L_i$ of length of phase delay by one or more phase shifters provided in an $i^{th}$ path among the plurality of paths facing an $i^{th}$ output terminal among the plurality of output terminals satisfies the following condition:

$$\sin\theta = \frac{\lambda c L_i}{2\pi d_i},$$

wherein $\lambda$ is a wavelength of incident light, $\theta$ is a steering angle, and c is a real number which is not 0, wherein i represents an integer from 1 to $2^M$.

The LiDAR device, wherein the light source, the beam steering device, and the receiver may be integrated on one silicon substrate.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
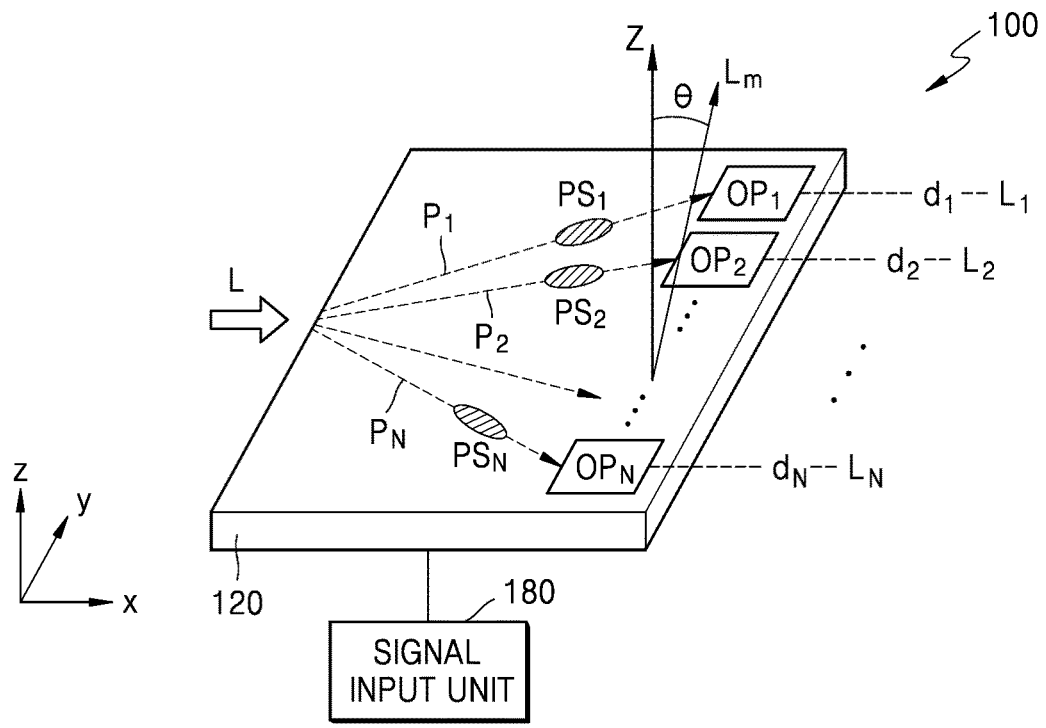
FIG. 1 is a conceptual diagram schematically illustrating a structure of a beam steering device according to an example embodiment.

Hereinafter, example embodiments will be described in detail with reference to the accompanying drawings. In the following drawings, like reference numerals refer to like elements and the sizes of components illustrated therein may be exaggerated for clarity. Example embodiments which will be described below are merely examples and various changes may be made thereto.

It will be understood that when an element or layer is referred to as being "on" another element or layer, the element or layer can be directly on another element or layer or intervening elements or layers.

It will be understood that, although the terms "first," "second," "third," etc., may be used herein to describe various components, these components should not be limited by these terms. These terms are only used to distinguish one component from another component.

As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any combination of a plurality of related listed items or any of the plurality of related listed items. The expression, "at least one of a, b, and c," should be understood as including only a, only b, only c, both a and b, both a and c, both b and c, or all of a, b, and c.

The terms "unit", "module," etc., should be understood to mean a unit which processes at least one function or operation and may be embodied as hardware, software, or a combination thereof.

FIG. 1 is a conceptual diagram schematically illustrating a structure of a beam steering device 100 according to an example embodiment.

In the beam steering device 100, incident light L may be split into a plurality of paths and may then be output to a plurality of output terminals $OP_1$, $OP_2$, ..., $OP_N$. Phases of the output terminals $OP_1$, $OP_2$, ..., $OP_N$ and a position of an array thereof may be determined to achieve a desired emission angle θ by the beam steering device 100. Thus, the array of the output terminals $OP_1$, $OP_2$, ..., $OP_N$ may be also referred to as an optical phased array (OPA).

To achieve the emission angle θ, the beam steering device 100 includes an optical waveguide 120 which splits the incident light L into a plurality of paths and outputs the split incident light L to the output terminals $OP_1$, $OP_2$, ..., $OP_N$, a plurality of phase shifters $PS_1$, $PS_2$, ..., $PS_N$ arranged in the plurality of paths, and a signal input unit 180 which supplies a signal to the phase shifters $PS_1$, $PS_2$, ..., $PS_N$.

The optical waveguide 120 provides light paths $P_1$, $P_2$, ..., $P_N$ via which the split incident light L travels toward the N output terminals $OP_1$, $OP_2$, ..., $OP_N$.

In an example embodiment, in the beam steering device 100, the output terminals $OP_1$, $OP_2$, ..., $OP_N$ may be arranged aperiodically. That is, the distances between the output terminals $OP_1$, $OP_2$, ..., $OP_N$ may not be uniform. If the positions of the output terminals $OP_1$, $OP_2$, ..., $OP_N$ are expressed as $d_1, d_2, ..., d_N$, these values may be random values.

The array of the output terminals $OP_1$, $OP_2$, ..., $OP_N$ may be set to be aperiodic to reduce higher-order diffracted light output from the output terminals $OP_1$, $OP_2$, ..., $OP_N$. 0-order diffracted light may be light for achieving light output in an intended direction where the emission angle is θ. First-order or higher-ordered diffracted light may be light output at a different angle other than θ. This light may also be referred to as a side lobe and may be a noise component when a direction in which light is output is adjusted. As the aperiodic features of the output terminals $OP_1$, $OP_2$, ..., $OP_N$ increase, higher-order diffracted light may decrease to a negligible level.

The phase shifters $PS_1$, $PS_2$, ..., $PS_N$ are arranged in the light paths $P_1$, $P_2$, ..., $P_N$ respectively facing the output terminals $OP_1$, $OP_2$, ..., $OP_N$ such that the emission angle θ may be achieved through a combination of the phases of light output from the aperiodically arranged output terminals $OP_1$, $OP_2$, ..., $OP_N$. The phase shifters $PS_1$, $PS_2$, ..., $PS_N$ respectively arranged in the light paths $P_1$, $P_2$, ..., $P_N$ may be determined to achieve a phase delay length according to the output terminals $OP_1$, $OP_2$, ..., $OP_N$ which the light paths $P_1$, $P_2$, ..., $P_N$ face. FIG. 1 illustrates that one phase shifter is arranged in each of the light paths, but example embodiments are not limited thereto. For example, more than one phase shifter may be arranged in each of the light paths to achieve a desired phase delay length.

Phases, which are to be achieved at the output terminals $OP_1$, $OP_2$, ..., $OP_N$, may be $\Phi_1, \Phi_2, ..., \Phi_N$, and are related to phase delay length $L_1, L_2, ..., L_N$ achieved by the phase shifters $PS_1$, $PS_2$, ..., $PS_N$. For example, a phase $\Phi_i$ and a phase delay length $L_i$ may have the following relation:

$$\Phi_i = cL_i \quad (1),$$

wherein c represents a real number which is not 0.

When the same signal is supplied to the phase shifters $PS_1$, $PS_2$, ..., $PS_N$ by the signal input unit 180, a desired phase may be achieved by adjusting the phase delay length. Even if the same signal is supplied to the different phase shifters $PS_1$, $PS_2$, ..., $PS_N$, different length of phase delay occur according to phase delay length designed for the different phase shifters $PS_1$, $PS_2$, ..., $PS_N$. The phase delay length $L_1, L_2, ..., L_N$ may be the same as or be proportional to the lengths of the phase shifters $PS_1$, $PS_2$, ..., $PS_N$ in an optical-path direction.

Phases of light output from the output terminals $OP_1$, $OP_2$, ..., $OP_N$ arranged aperiodically at the positions $d_1, d_2, ..., d_N$ may be set to be $\Phi_1, \Phi_2, ..., \Phi_N$ to satisfy a phase condition according to a steering angle θ of output light. According to an example embodiment, the sum of length of phase delay achieved by at least one phase shifter $PS_i$ arranged in the light path $P_i$ may be $L_i$.

Figure 2:
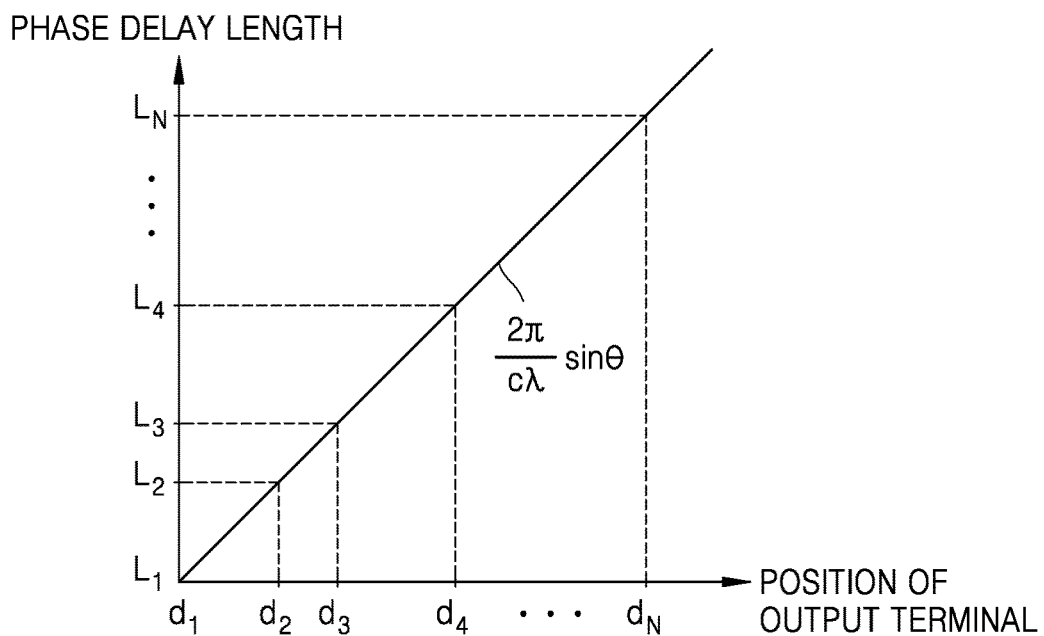
FIG. 2 is a graph showing phase delay length in paths facing output terminals of a beam steering device versus the positions of the output terminals according to an example embodiment.

FIG. 2 is a graph showing phase delay length $L_1$, $L_2$, ..., $L_N$ in paths facing output terminals $OP_1$, $OP_2$, ..., $OP_N$ of a beam steering device 100 versus the positions $d_1, d_2, ..., d_N$ of the output terminals $OP_1$, $OP_2$, ..., $OP_N$, according to an example embodiment.

A steering angle θ is determined according to a wavelength λ of incident light as follows:

$$\sin\theta = \frac{\lambda \phi_i}{2\pi d_i} = \frac{\lambda c L_i}{2\pi d_i} \quad (2)$$

It is assumed in the graph that the position $d_1$ of the first output terminal $OP_1$ and the phase delay length $L_1$ are each 0. A slope $L_i/d_i$ of the graph showing the phase delay length $L_1, L_2, ..., L_N$ according to the positions $d_1, d_2, ..., d_N$ of the output terminals $OP_1$, $OP_2$, ..., $OP_N$ is $(2\pi/c\lambda)\sin\theta$.

Figure 3:
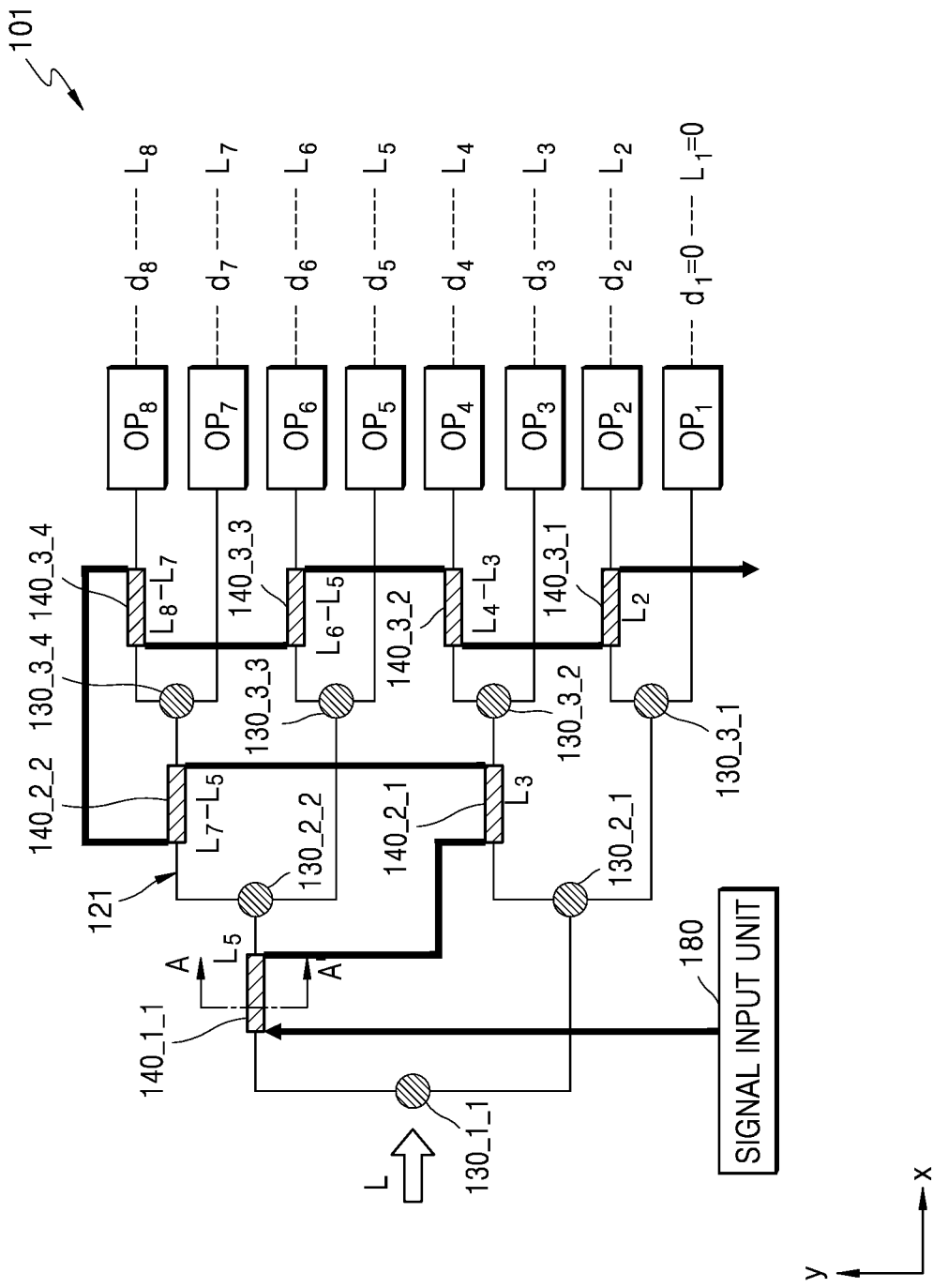
FIG. 3 is a plan view schematically illustrating a structure of a beam steering device according to an example embodiment.

FIG. 3 is a plan view schematically illustrating a structure of a beam steering device 101 according to an example embodiment.

The beam steering device 101 includes an optical waveguide 121 which provides optical paths via which incident light L is split M number of times in the form of a full binary tree structure. Here, M represents an integer greater than or equal to 1. The optical waveguide 121 may have $(2^M-1)$ split points and $2^M$ output terminals. In an example embodiment, the optical waveguide 121 of the beam steering device 101 may have eight output terminals $OP_1$, $OP_2$, ..., $OP_8$ and seven split points when M is 3. In FIG. 3, the optical path which the optical waveguide 121 provides is illustrated in bold solid lines. An example of a structure of the optical waveguide 121 will be described in detail with reference to FIG. 4 below.

A plurality of splitters, which each split input light into two branches, may be provided at the split points. The splitters may split the input light into two branches in a 1:1 manner, but example embodiments are not limited thereto. The splitters provided at the split points are illustrated as 130_m_i in FIG. 3. A splitter 130_m_i is an $i^{th}$ splitter in an upward direction, starting from an $m^{th}$ split position. Here, m may represent an integer from 1 to 3, and i may represent an integer from 1 to $2^{m-1}$.

A phase shifter 140_m_i is an $i^{th}$ phase shifter in the upward direction, starting from an $m^{th}$ branch. Here, m may represent an integer from 1 to 3, and i may represent an integer from 1 to $2^{m-1}$. The phase shifter 140_m_i may be arranged at only one of two branches of each of the splitters 130_m_i in the optical waveguide 121 having the full binary tree structure. However, the position of the phase shifter 140_m_i is thus not limited thereto.

A phase delay length L indicated below each of the phase shifters 140_m_i represents a phase delay length which the phase shifters 140_m_i are set therefor. The phase delay length of each of the phase shifters 140_m_i is set such that the sum of length of phase delay achieved by phase shifters provided in a path facing the $i^{th}$ output terminal $OP_i$ is $L_i$.

For example, when a position $d_1$ of the output terminal $OP_1$ is set to be 0 and a phase delay length $L_1$ in a path facing the output terminal $OP_1$ is set to be 0, the sum of length of phase delay achieved by a phase shifter 140_3_1 provided in a path facing the output terminal $OP_2$ is $L_2$ and the sum of length of phase delay achieved by phase shifters 140_1_1 and 140_3_3 provided in a path facing the output terminal $OP_6$ is $L_6$, and the sum of length of phase delay achieved by phase shifters 140_1_1, 140_2_2, and 140_3_4 provided in a path facing the output terminal $OP_8$ is $L_8$.

$L_i$ is determined according to Equation 2 above.

A method according to an example embodiment of setting a length of phase delay to be achieved by each of phase shifters 140_m_i arranged in each of the optical paths to set the sums $L_1, L_2, \ldots, L_N$ of the phase delay length in optical paths respectively facing the output terminals $OP_1, OP_2, \ldots, OP_8$ will be described below.

First, a phase delay length of a phase shifter 140_3_k arranged in an optical path which faces an even-numbered output terminal $OP_{2k}$ and is at an $M^{th}$ branch which is a last branch may be set to be $L_{2k} - L_{2k-1}$. Here, k represents an integer from 1 to $2^{M-1}$. That is, a phase delay length of the phase shifter 140_3_1 arranged in an optical path which faces the output terminal $OP_2$ and is at a third branch which is a last branch may be set to be $L_2 - L_1 = L_2$, a phase delay length of the phase shifter 140_3_2 arranged in an optical path which faces the output terminal $OP_4$ and is at the third branch may be set to be $L_4 - L_3$, a phase delay length of the phase shifter 140_3_3 arranged in an optical path which faces the output terminal $OP_6$ and is at the third branch may be set to be $L_6 - L_5$, and a phase delay length of the phase shifter 140_3_4 arranged in an optical path which faces the output terminal $OP_8$ and is at the third branch may be set to be $L_8 - L_7$.

Next, a phase delay length of the phase shifter 140_1_1 located at one of two branches of the splitter 130_1_1 located at a first split point may be set to be $L_n$, i.e., $L_5$. Here, $n = 2^{M-1} + 1$.

Next, phase delay length of the phase shifters 140_2_1 and 140_2_2 each being arranged at one of two branches of each of the splitters 130_2_1 and 130_2_2 located at a second split point may be determined to satisfy a phase delay degree $L_i$ required for the sum of phase delay length in an optical path facing each of the output terminals OPi.

For example, a phase delay degree of the phase shifter 140_2_2 may be determined to be $L_7 - L_5$ such that the sum of phase delay length in an optical path facing the output terminal $OP_8$ is $L_8$.

A phase delay degree to be achieved by each of all the phase shifters 140_m_i in the optical paths may be set as described above. Furthermore, the phase shifters 140_m_i may be designed such that the lengths thereof in the directions of the optical paths are the same as or are proportional to the phase delay length thereof.

The phase shifters 140_m_i may be connected as illustrated in FIG. 3 to receive the same signal from the signal input unit 180. A connection form of the phase shifters 140_m_i illustrated in FIG. 3 is an example, and example embodiments are not limited thereto. A signal supplied from the signal input unit 180 may be an electrical signal, e.g., current. Since the phase shifters 140_m_i are connected in series, the same current supplied from the signal input unit 180 may flow to the phase shifters 140_m_i. When the signal supplied from the signal input unit 180 is applying a voltage, the phase shifters 140_m_i may be connected in parallel such that the same voltage may be applied thereto.

The phase shifters 140_m_i have different phase delay lengths. The same signal determined by the signal input unit 180 considering the steering angle θ may be supplied to the phase shifters 140_m_i. To change the steering angle θ, a value of a signal to be supplied from the signal input unit 180 may be changed and the changed value of the signal may be commonly supplied to the phase shifters 140_m_i.

As described above, a value of a signal to be supplied to the phase shifters 140_m_i may be adjusted to adjust the steering angle θ rather than individually adjusting each signal to be supplied to each of the phase shifters 140_m_i, respectively. Accordingly, various steering angles may be more easily achieved.

Figure 4:
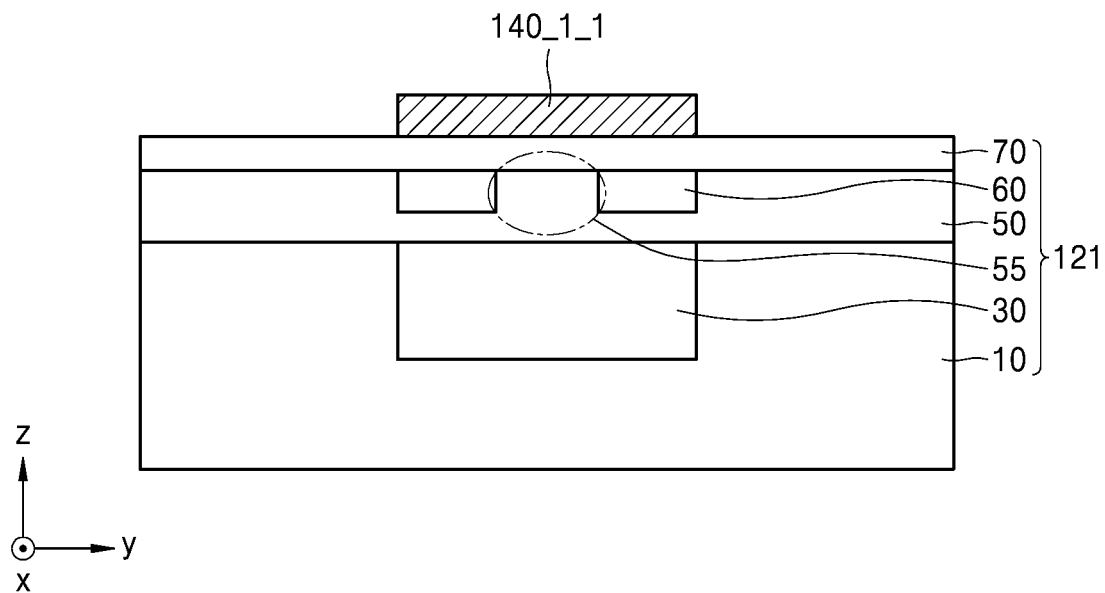
FIG. 4 is a detailed cross-sectional view taken along line A-A' of the plan view of FIG. 3.

FIG. 4 is a detailed cross-sectional view taken along line A-A' of the plan view of FIG. 3.

Referring to FIG. 4, the optical waveguide 121 may be provided on a silicon substrate 10. An embedded insulating layer 30, an epitaxial layer 50, a side clad layer 60, and an upper clad layer 70 may be provided on the silicon substrate 10. The side clad layer 60 and the upper clad layer 70 may be insulating layers having lower refractive indexes than that of the epitaxial layer 50. For example, the side clad layer 60 and the upper clad layer 70 may be oxide films such as silicon oxide films. The side clad layer 60 and the upper clad layer 70 may be formed of the same material or different materials. In the epitaxial layer 50, a core region 55 surrounded by the side clad layer 60 and the upper clad layer 70 may provide a light traveling path (an x-axis direction path). A whole shape of the optical waveguide 121 may be set such that the core region 55 extends in a direction indicated by a solid line in the plan view of FIG. 3.

A phase shifter 140_1_1 may delay a phase of light passing through the core region 55 by changing a refractive index of the core region 55 according to an input signal. The phase shifter 140_1_1 may be provided above the core region 55 and may be a heater configured to be electrically heated to heat the core region 55. A metal material such as chromium (Cr), nickel (Ni), nichrome, or tungsten (W), or tungsten silicide (WSix) may be used as a material of the heater. When current is supplied to the phase shifter 140_1_1, heat is generated which may locally increase the temperature of the core region 55 of the optical waveguide 121 below the phase shifter 140_1_1. The refractive index of the core region 55 may change proportional to a change in the temperature thereof according to a thermo-optic coefficient of a material of the core region 55. Thus, a phase delay length of the phase of the light passing through the core region 55 may be shifted. Since a phase delay length of the phase shifter 140_1_1 is set to be $L_5$, an x-axis direction length of the phase shifter 140_1_1 may be determined such that an x-axis direction length of the core region 55, the refractive index of which is changed through heating of the phase shifter 140_1_1, is $L_5$. The x-axis direction length of the phase shifter 140_1_1 may be the same as or be proportional to the phase delay length $L_5$.

Figure 5:
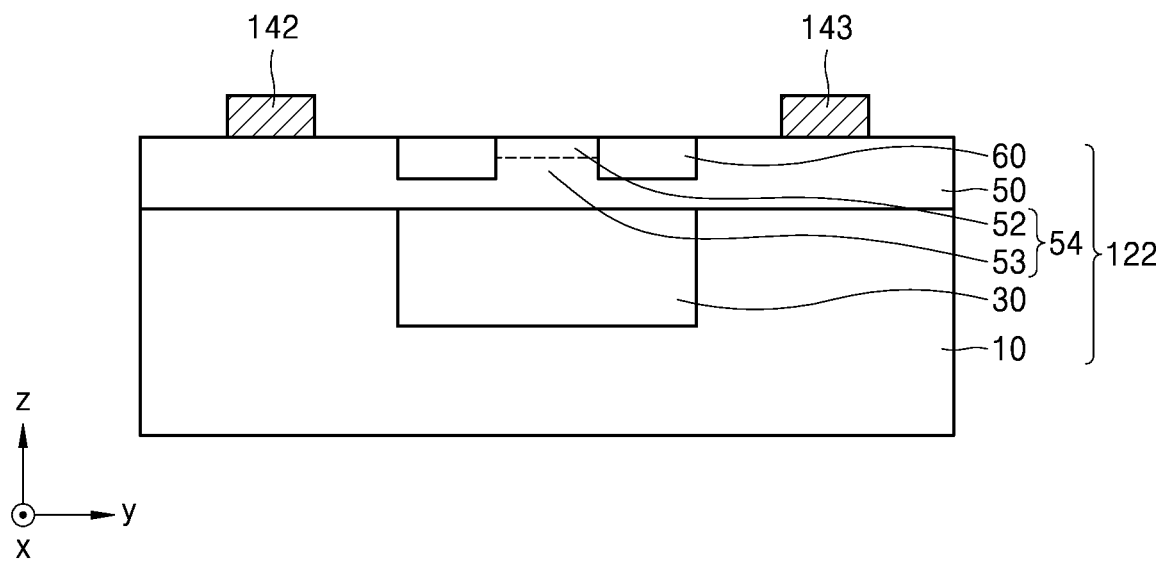
FIG. 5 is a cross-sectional view taken along line A-A' of a modified example of the beam steering device of FIG. 3.

FIG. 5 is a cross-sectional view taken along line A-A' of a modified example of the beam steering device 101 of FIG. 3.

Referring to FIG. 5, an optical waveguide 122 may be provided on a silicon substrate 10. An embedded insulating layer 30, an epitaxial layer 50, and a side clad layer 60 may be provided on the silicon substrate 10. A core region 54 may be formed of a PN diode. In the core region 54, an upper layer 52 may be of P type and a lower layer 53 may be of N type, and vice versa. A phase shifter may include two electrodes 142 and 143 through which a reverse voltage is applied to the PN diode. When the reverse voltage is applied to the PN diode via the two electrodes 142 and 143, a carrier concentration in the PN diode of the core region 54 may change and thus a refractive index of the core region 54 may change. A phase of light passing through the core region 54 having the changed refractive index may be shifted.

An optical-path-direction (x-axis direction) length of one of the two electrodes 142 and 143 of the phase shifter may be determined to be the same as or be proportional to a predetermined phase delay length such that an x-axis length of the core region 54 having a refractive index changed by a voltage applied between the two electrodes 142 and 143 is the same as or proportional to the predetermined phase delay length.

FIGS. 4 and 5 illustrate phase shifters that are either heaters configured to be electrically heated to change the refractive indexes of the core regions 54 and 55 or electrode structures configured to apply a reverse voltage to a PN diode structure to change the refractive indexes of the core regions 54 and 55. However, the phase shifters are not limited thereto, and various structures capable of adjusting a phase delay length by adjusting a length of a variable optical-property region of a core region of an optical waveguide may be employed.

Figure 6A:
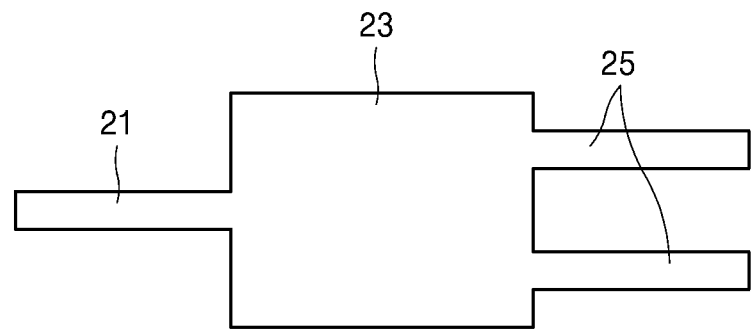
FIGS. 6A, 6B and 6C are plan views of examples of shapes of splitters which may be employed in the beam steering device of FIG. 3.
Figure 6B:
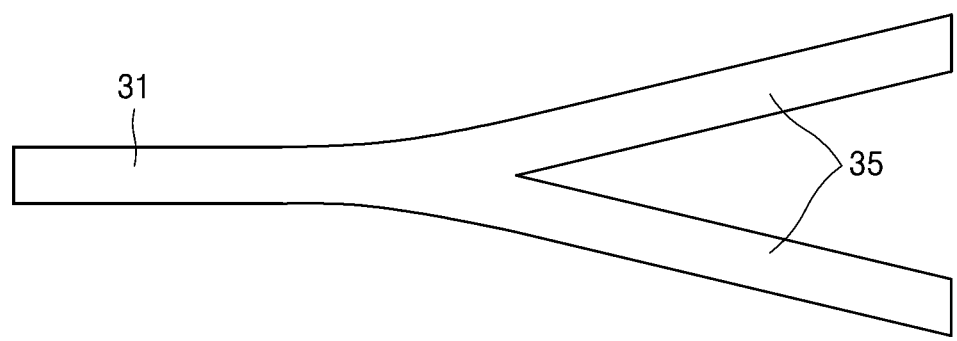
Figure 6C:
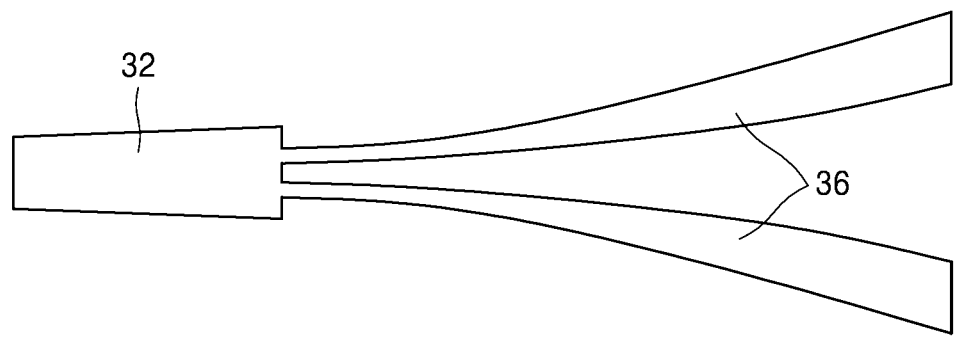

FIGS. 6A, 6B and 6C are plan views of examples of shapes of splitters which may be employed in the beam steering device 101 of FIG. 3.

The splitters may each include one input region and two output regions to split incident light into two branches.

The splitter of FIG. 6A may be a multi-mode interference (MMI) splitter and may include an input waveguide region 21, a multi-mode waveguide region 23, and an output waveguide region 25. The multi-mode waveguide region 23 may have a shape satisfying certain length and width conditions to split a beam through multimode interference.

The splitters illustrated in FIGS. 6B and 6C are Y-branch splitters. The splitter of FIG. 6B includes an input waveguide region 31 and an output waveguide region 35. Widths of the input waveguide region 31 and the output waveguide region 35 may be uniform. The splitter of FIG. 6C includes an input waveguide region 32 and an output waveguide region 36. The input waveguide region 32 and the output waveguide region 36 may each have a tapered shape, the width of which changes in a direction in which light travels.

Although the MMI splitter and the Y-branch splitters have been described above as examples with reference to FIGS. 6A to 6C, example embodiments are not limited thereto, and, for example, a directional coupler (DC) may be employed.

Figure 7:
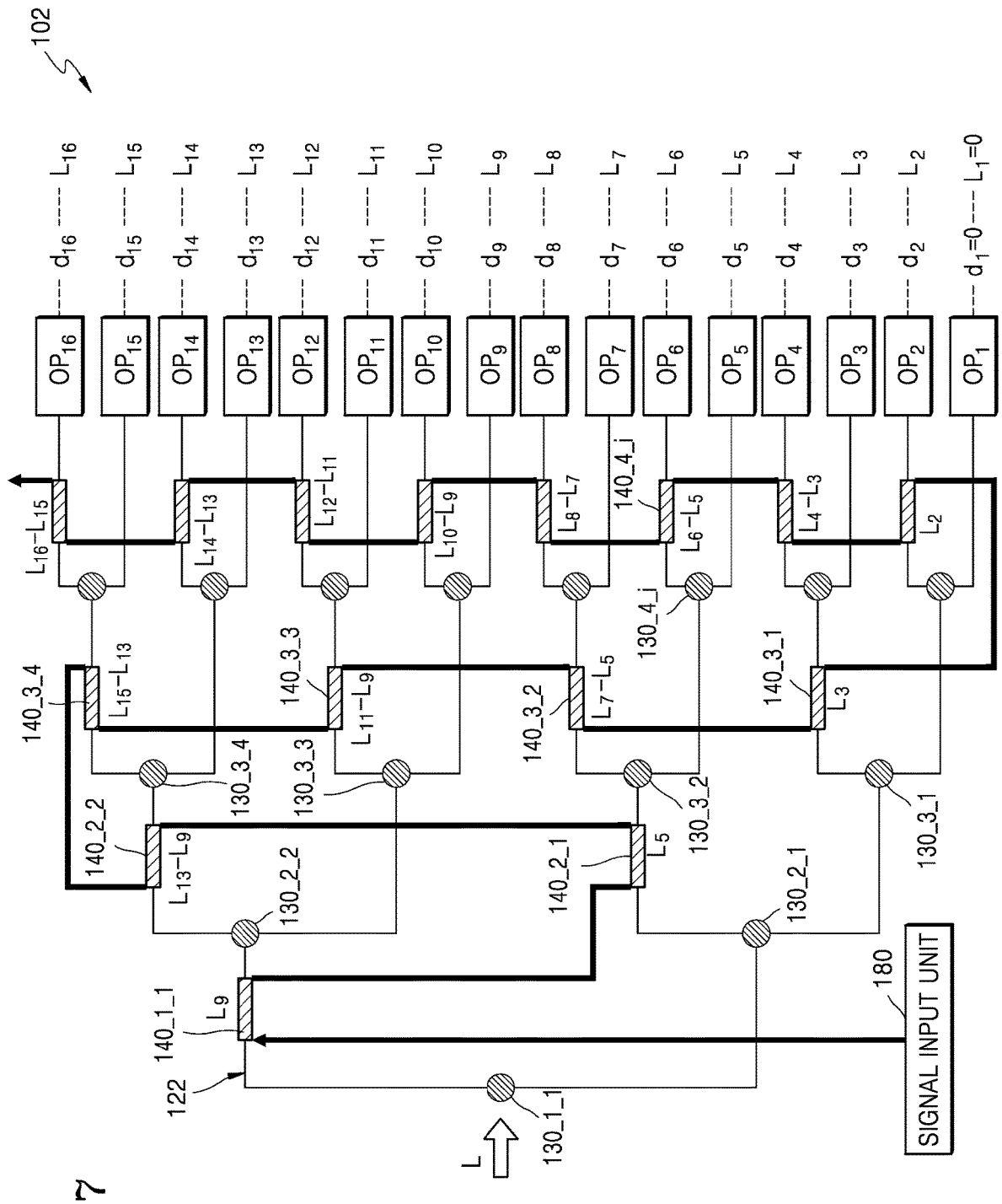
FIG. 7 is a plan view schematically illustrating a structure of a beam steering device according to an example embodiment.

FIG. 7 is a plan view schematically illustrating a structure of a beam steering device 102 according to an example embodiment.

The beam steering device 102 is differentiated from the beam steering device 101 of FIG. 3 in that an optical waveguide 122 is configured to provide an optical path having a full binary tree structure to split incident light $L_1$ 4 times.

The optical waveguide 122 has $(2^M-1)$ split points and $2^M$ output terminals. That is, when M=4, the optical waveguide 122 of the beam steering device 102 has sixteen output terminals $OP_1, OP_2, \ldots, OP_{16}$ and fifteen split points.

A plurality of splitters may be provided at the split points to split input light into two branches. The splitters provided at the split points are expressed as 130_m_i. A splitter 130_m_i means an $i^{th}$ splitter in an upward direction, starting from an $m^{th}$ split position. Here, m represents an integer from 1 to 4, and i represents an integer from 1 to $2^{m-1}$.

A phase shifter 140_m_i means an $i^{th}$ phase shifter in the upward direction, starting from an $m^{th}$ branch. Here, m represents an integer from 1 to 4, and i represents an integer from 1 to $2^{m-1}$. In the optical waveguide 122 having the full binary tree structure, the phase shifter 140_m_i may be arranged at only one of two branches of each of the splitters 130_m_i.

Positions $d_1, d_2, \ldots, d_{16}$ of the output terminals $OP_1, OP_2, \ldots, OP_{16}$ are set to be aperiodic, and phase delay length of the phase shifters 140_m_i are set such that the sum of phase delay length is $L_i$ in optical paths facing the positions $d_1, d_2, \ldots, d_{16}$ of the output terminals $OP_1, OP_2, \ldots, OP_{16}$. Here, m represents an integer from 1 to 4, and i represents an integer from 1 to $2^{m-1}$.

A method according to an example embodiment of setting a phase delay length of each of the phase shifters 140_m_i in the optical paths to set the sums $L_1, L_2, \ldots, L_{16}$ of phase delay length in the optical paths facing the output terminal $OP_1, OP_2, \ldots, OP_{16}$ will be described below.

First, a phase delay length of a phase shifter 140_4_k arranged in an optical path facing an even-numbered output terminal $OP_{2k}$ and located at a fourth branch which is a last branch may be set to be $L_{2k}-L_{2k-1}$. Here, k represents an integer from 1 to $2^{M-1}$, and M=4. That is, a phase delay length of a phase shifter 140_4_1 arranged in the optical path facing the output terminal $OP_2$ and located at a fourth branch which is a last branch may be set to be $L_2-L_1=L_2$. A phase delay length of a phase shifter 140_4_2 arranged in an optical path facing the output terminal $OP_4$ and located at the fourth branch may be set to be $L_4-L_3$. A phase delay length of a phase shifter 140_4_3 arranged in an optical path facing the output terminal $OP_6$ and located at the fourth branch may be set to be $L_6-L_5$. A phase delay length of a phase shifter 140_4_4 arranged in an optical path facing the output terminal $OP_8$ and located at a third branch may be set to be $L_8-L_7$. A phase delay length of a phase shifter 140_4_5 arranged in an optical path facing output terminal $OP_{10}$ and located at the fourth branch may be set to be $L_{10}-L_9$. A phase delay length of a phase shifter 140_4_6 arranged in an optical path facing the output terminal $OP_{12}$ and located at the fourth branch may be set to be $L_{12}-L_{11}$. A phase delay length of a phase shifter 140_4_7 arranged in an optical path facing the output terminal $OP_{14}$ and located at the fourth branch may be set to be $L_{14}-L_{13}$. A phase delay length of a phase shifter 140_4_8 arranged in an optical path facing the output terminal $OP_{16}$ and located at the fourth branch may be set to be $L_{16}-L_{15}$.

Next, a phase delay length of the phase shifter 140_1_1 arranged on one of two branches of the splitter 130_1_1 at a first split point may be set to be $L_n$, i.e., $L_9$. Here, $n=2^{M-1}+1$.

After setting the phase delay length at the last and first split positions as described above, the phase delay length of the phase shifters 140_2_1 and 140_2_2 arranged at one of two branches of the splitters 130_2_1 and 130_2_2 at the second split point, and the phase delay length of the phase shifters 140_3_1, 140_3_2, 140_3_3, and 140_3_4 located at one of two branches of the splitters 130_3_1, 130_3_2, 130_3_3, and 130_3_4 at the third split point may be determined to satisfy the sum $L_i$ of phase delay length in the optical paths respectively facing the output terminals $OP_i$.

Figure 8:
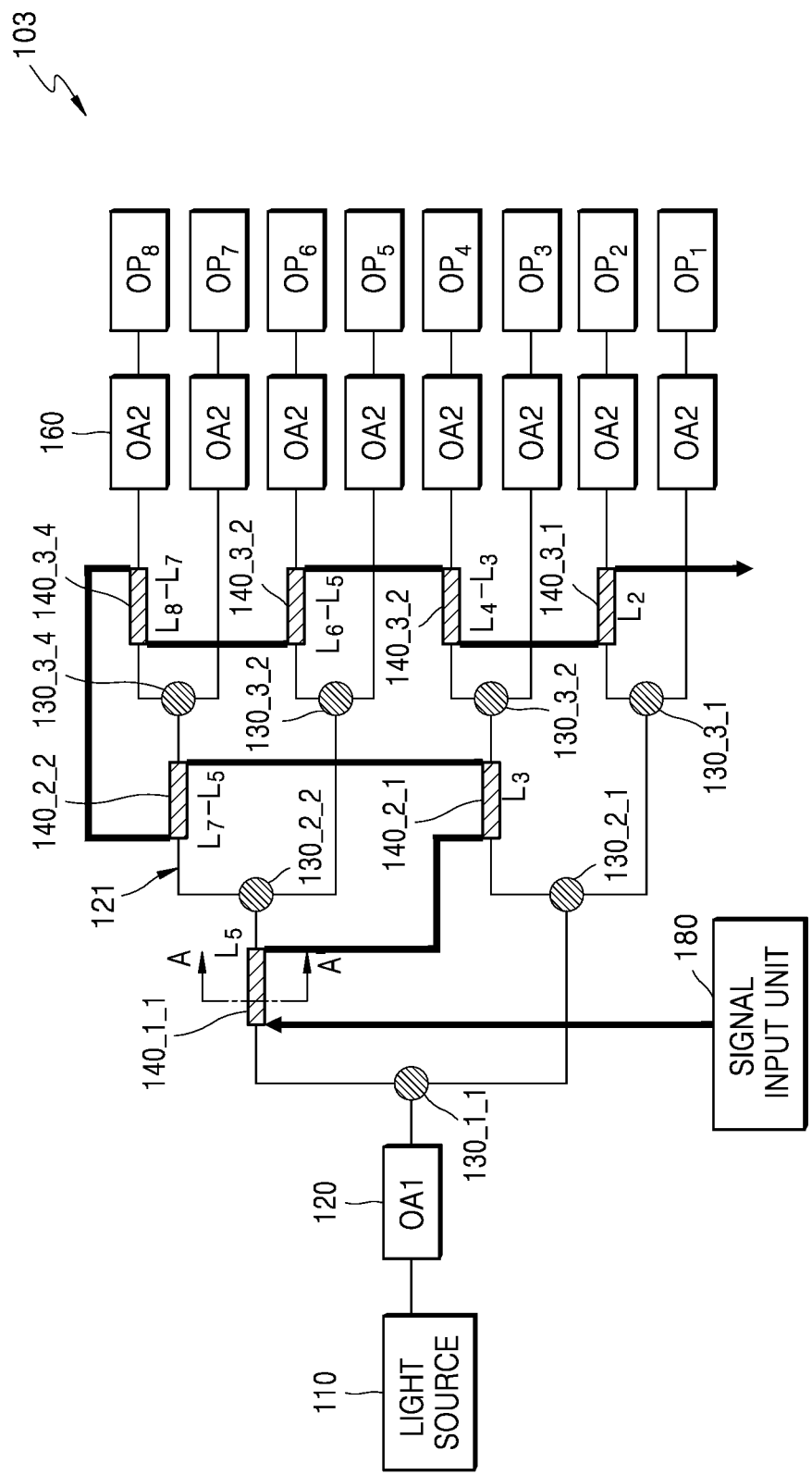
FIG. 8 is a plan view schematically illustrating a structure of a beam steering device according to an example embodiment.

FIG. 8 is a plan view schematically illustrating a structure of a beam steering device 103 according to an example embodiment.

The beam steering device 103 has substantially the same structure as the beam steering device 101 of FIG. 3, except that the beam steering device 103 further includes a light source 110 emitting light toward an optical waveguide 121, a first optical amplifier OA1 arranged at an input terminal of the optical waveguide 121, i.e., between the light source 110 and a first splitter 130_1_1, and configured to amplify an input optical signal, and second optical amplifiers OA2 arranged between a plurality of output terminals $OP_1$, $OP_2$, ..., $OP_8$ and splitters 130_3_1, 130_3_2, 130_3_3, and 130_3_4 performing third branching, and configured to amplify an optical signal and transmit the amplified optical signal to the output terminal $OP_1$, $OP_2$, ..., $OP_8$.

Examples of the light source 110 may include a laser diode (LD), a light-emitting diode (LED), a super luminescent diode (SLD), and the like. The light source 110 may be a wavelength-variable LD. The light source 110 may generate and emit light having different wavelength bands. The light source 110 may generate and emit pulse light or continuous light.

The first optical amplifier OA1 and the second optical amplifiers OA2 may be semiconductor optical amplifiers formed on a silicon substrate. The first optical amplifier OA1 and the second optical amplifiers OA2 may be fabry-perot amplifiers (FPAs), travelling wave amplifiers (TWAs), or the like. The first optical amplifier OA1 may be integrally formed with the light source 110.

Figure 9:
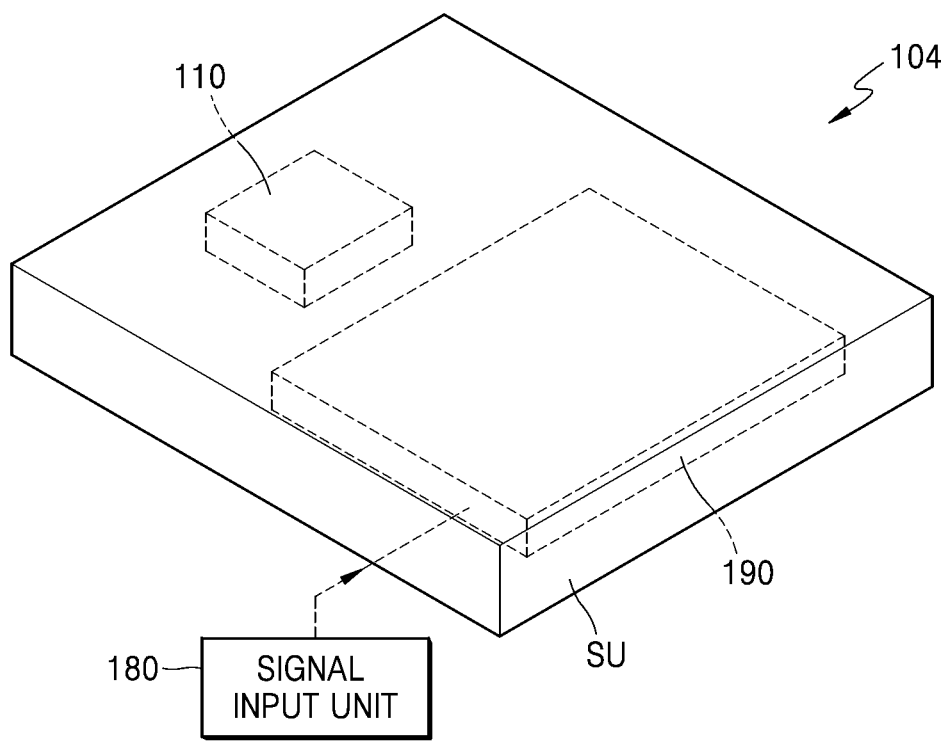
FIG. 9 is a perspective view illustrating a form in which components of a beam steering device according to an example embodiment are integrated.

FIG. 9 is a perspective view illustrating a form in which components of a beam steering device 104 according to an example embodiment are integrated.

The beam steering device 104 may be formed on one silicon substrate SU in the form of an optical integrated circuit.

A light source 110 may be a silicon-based LD or LED. Similarly, an optical waveguide 190 may have a silicon-based structure. Here, the optical waveguide 190 may include splitters and phase shifters as described above. The light source 110 and the optical waveguide 190 may be integrated on one silicon substrate SU. A technique for forming optical devices based on a silicon substrate is referred to as silicon (Si)-photonics. The beam steering device 104 may be manufactured using a process used to Si-photonics.

The beam steering devices according to example embodiments may be employed in various types of electronic apparatuses.

Figure 10:
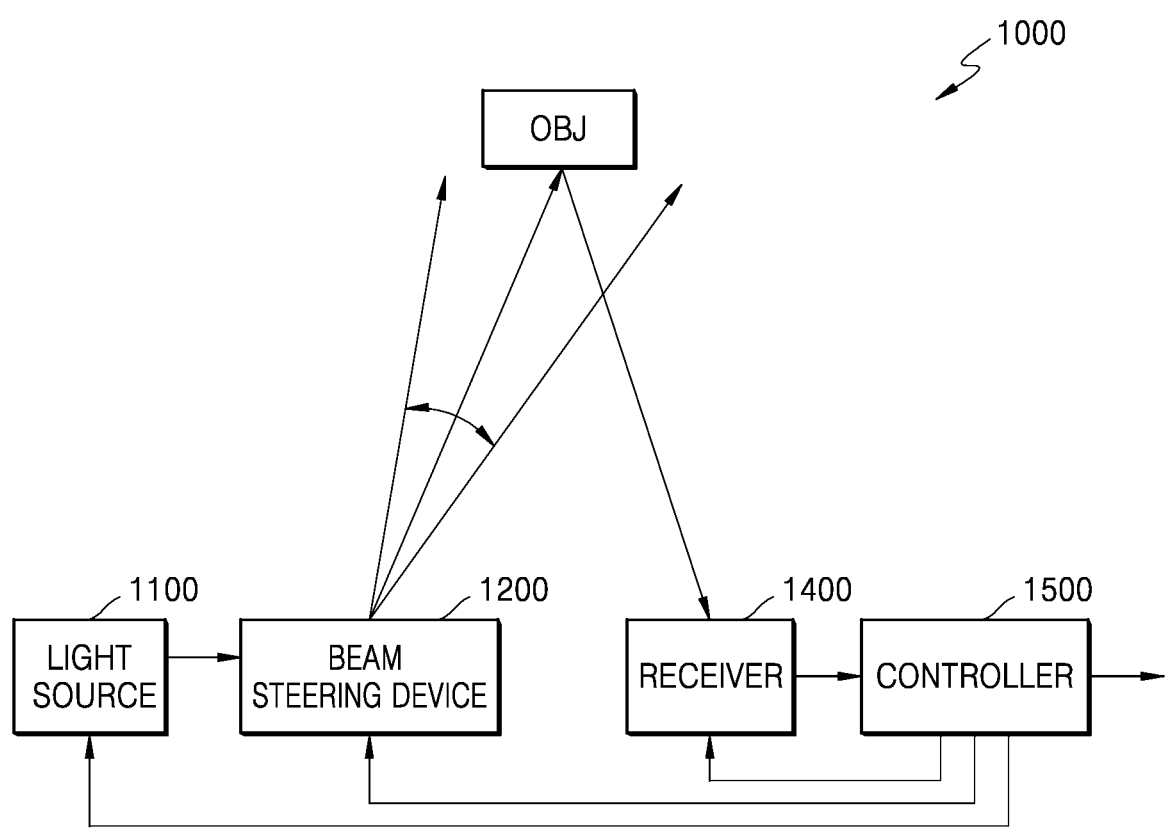
FIG. 10 is a schematic block diagram of a light detection and ranging (LiDAR) device according to an example embodiment.

FIG. 10 is a schematic block diagram of a light detection and ranging (LiDAR) device 1000 according to an example embodiment.

The LiDAR device 1000 may include a light source 1100 which emits light, a beam steering device 1200 which steers light emitted from the light source 1100 to travel toward an object OBJ, a receiver 1400 which receives light reflected from the object OBJ, and a controller 1500 which controls the light source 1100, the beam steering device 1200, and the receiver 1400.

The light source 1100 may emit light to analyze a position and shape of the object OBJ. The light source 1100 may include a light source for generating and emitting light of a certain wavelength. The light source 1100 may include a light source, such as an LD, an LED or an SLD, which generates and emits light of a wavelength appropriate for analyzing the position and shape of the object OBJ, e.g., light of an infrared wavelength band. The light source 1100 may be a wavelength-variable LD. The light source 1100 may generate and emit light of different wavelength bands. The light source 1100 may generate and emit pulse light or continuous light.

The beam steering device 1200 may split light from the light source 1100 into a plurality of paths and may output the split light to a plurality of aperiodically arranged output terminals. The beam steering device 1200 may include phase shifters for controlling phases of the light at the output terminals by using a single signal and may thus achieve a desired emission angle θ. The beam steering device 100, 101, 102, 103, 104, a combination thereof, or a modified example thereof of an equivalent range may be used as the beam steering device 1200. In the beam steering device 1200, an emission angle may be controlled, for example, according to a signal supplied to the phase shifters of the beam steering device 1200 as described above and thus a certain range including the object OBJ may be scanned.

Other optical members, for example, optical members for control of a path of light steered in the beam steering device 1200, splitting of the light, and additional light modulations, may be further arranged between the beam steering device 1200 and the object OBJ.

The receiver 1400 may include an array of sensors for sensing light reflected from the object OBJ. The receiver 1400 may include arrays of sensors for sensing light of different wavelengths. The receiver 1400 may include an array of silicon-based photodiodes. While the beam steering device 1200 scans the object OBJ, an optical signal received by the receiver 1400 may be used to analyze the presence, position, shape, etc. of the object OBJ.

The controller 1500 may control all operations of the LiDAR device 1000. The controller 1500 may control operations of the light source 1100, the beam steering device 1200, and the receiver 1400. For example, the controller 1500 may control power supply, perform on/off control, and control generation of a pulse wave or a continuous wave with respect to the light source 1100. Furthermore, the controller 1500 may control a signal to be supplied to the phase shifters of the beam steering device 1200 to control an emission angle to be achieved by the beam steering device 1200.

The controller 1500 may receive an optical signal from the object OBJ and analyze the presence, position, shape, physical properties, etc. of the object OBJ. The controller 1500 may perform, for example, an operation of measuring a time of flight and determine a three-dimensional (3D) shape of the object OBJ on the basis of a result of measuring the time of flight, or may analyze physical properties of the object OBJ through Raman analysis.

The controller 1500 may perform various operation methods. For example, in a direct time measurement method, a distance is measured by projecting a pulse wave onto the object OBJ and measuring a time period needed to receive light reflected from the object OBJ by using a timer. In a correlation method, pulse light is projected onto the object OBJ and a distance is measured using the brightness of light reflected from the object OBJ. In a phase delay measurement method, continuous wave light such as a sine wave is projected onto the object OBJ and a phase difference between light reflected from the object OBJ is sensed and converted into a distance.

Furthermore, the controller 1500 may analyze the type, ingredients, concentration, and physical properties of the object OBJ through the Raman analysis for detecting a change in a wavelength of the object OBJ.

The LiDAR device 1000 may include a memory configured to store programs for the above-described operation and other data.

The controller 1500 may transmit a result of performing the operation, i.e., information regarding the shape, position, and physical properties of the object OBJ, to another unit. For example, information regarding the 3D shape, operation, or position of the object OBJ may be transmitted to a self-driving device which needs this information. Furthermore, the information regarding the physical properties, e.g., bio-data, of the object OBJ may be transmitted to a medical device which uses this information. The other unit to which the result of performing the operation is transmitted may be a display device or a printer. In addition, the other unit may be, but is not limited to, a smartphone, a cellular phone, a personal digital assistant (PDA), a laptop computer, a personal computer (PC), or another mobile or non-mobile computing device.

The controller 1500 as described above may be implemented as at least one execution program that may be executed by a processor, and the execution program may be stored in a non-transitory computer readable medium.

The LiDAR device 1000 may be used as a sensor which obtains 3D information regarding an object located in front thereof in real time, and be applied to self-driving devices, e.g., a driverless car, an autonomous vehicle, a robot, a drone, etc.

Figure 11:
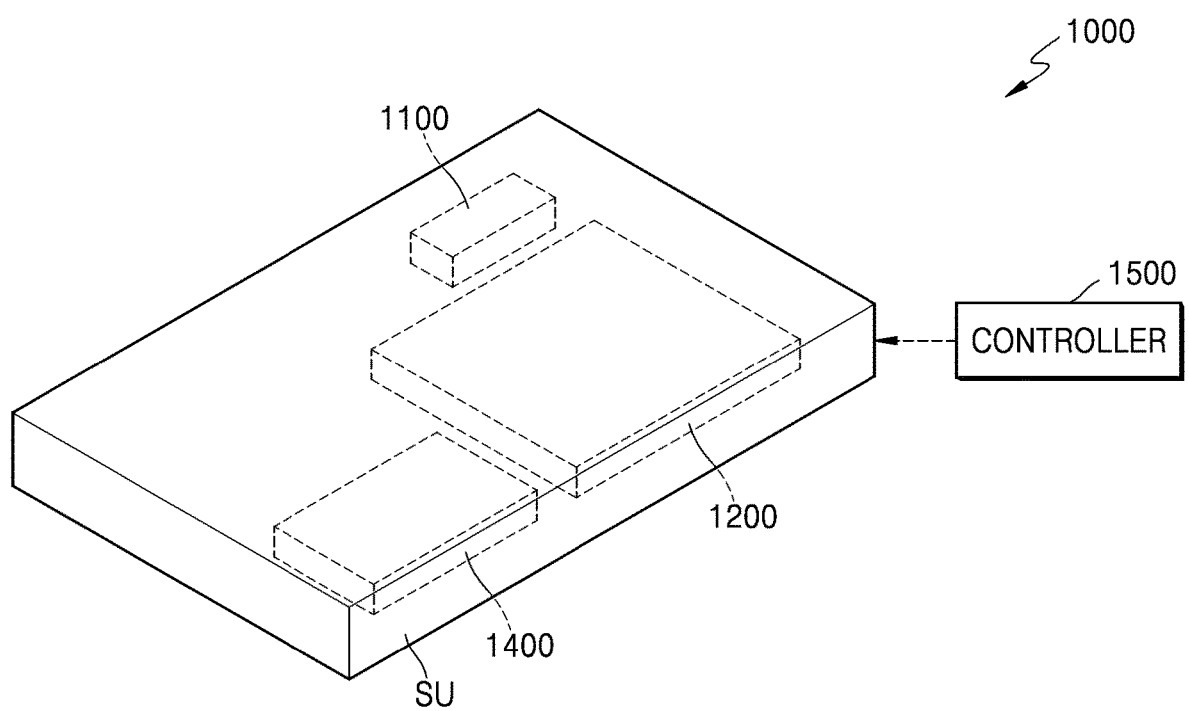
FIG. 11 is a perspective view illustrating a form in which components of the LiDAR device of FIG. 10 are integrated.

FIG. 11 is a perspective view illustrating a form in which the components of the LiDAR device 1000 of FIG. 10 are integrated.

The LiDAR device 1000 may be integrated on one silicon substrate SU using Si-photonics. That is, a silicon-based light source 1100, a silicon-based beam steering device 1200, and a silicon-based receiver 1400 may be integrated together on the one silicon substrate SU. In addition, other various optical elements may be integrated together on the silicon substrate SU. Thus, a Si-photonics system which is more economical, compact, and reliable may be achieved.

In beam steering devices according to one or more of the example embodiments, output terminals may be aperiodically arranged to reduce noise at a steering angle and improve the reliability of the steering angle.

The beam steering devices may be more easily driven since the same signal is supplied to a plurality of phase shifters, and a desired steering angle may be more easily achieved.

The beam steering devices may be employed in various optical devices and various electronic apparatuses, e.g., a LiDAR device, to obtain information regarding an object.

While the beam steering devices and the electronic apparatus including one of them have been described above with reference to the example embodiments illustrated in the drawings, they are merely examples and it will be understood by those of ordinary skill in the art that various changes in form and details may be made therein without departing from the spirit and scope of the disclosure as defined by the appended claims.

What is claimed is:

1. A beam steering device comprising:
   an optical waveguide configured to split input light emitted from a light source into a plurality of split light along a plurality of paths, and output the plurality of split light to a plurality of output terminals which are aperiodically arranged;
   a plurality of phase shifters provided in the plurality of paths, wherein at least two phase shifters among the plurality of phase shifters have different phase delay lengths;
   a signal input unit configured to supply a uniform signal to each of the plurality of phase shifters; and
   a plurality of splitters configured to split the into two branches of light,
   wherein the optical waveguide provides an optical path through which the input light is split M times in a full binary tree structure, and comprises ($2^M-1$) split points and $2^M$ output terminals, where M is an integer greater than or equal to 1,
   wherein the plurality of splitters are respectively arranged on one of the ($2^M-1$) split points, and
   wherein each of the plurality of phase shifters is arranged at only one of two branches of each of the plurality of splitters.

2. The beam steering device of claim 1, wherein a phase delay length of each of the plurality of phase shifters is set such that a sum of phase delay lengths of one or more phase shifters provided in a path, from the plurality of paths, facing one of the plurality of output terminals satisfies a phase condition based on the aperiodic arrangement of the plurality of output terminals and a steering angle of output light.

3. The beam steering device of claim 1, wherein, when a sum $L_1$ of phase delay lengths of one or more phase shifters provided in a path facing a first output terminal $OP_1$ is 0, a position $d_1$ of the first output terminal $OP_1$ is 0, and a position of an $i^{th}$ output terminal $OP_i$ is $d_i$, a sum $L_i$ of phase delay lengths of one or more phase shifters provided in an $i^{th}$ path among the plurality of paths facing an $i^{th}$ output terminal among the plurality of output terminals satisfies the following condition:

$$\sin\theta = \frac{\lambda c L_i}{2\pi d_i},$$

wherein $\lambda$ is a wavelength of incident light, $\theta$ is a steering angle, and c is a real number which is not 0, and
wherein i is an integer from 1 to $2^M$.

4. The beam steering device of claim 3, wherein a phase delay length of a phase shifter provided in an optical path which is an $M^{th}$ branch and facing an even-numbered output terminal $OP_{2k}$ among the plurality of output terminals is ($L_{2k}-L_{2k-1}$),
wherein k represents an integer from 1 to $2^{M-1}$.

5. The beam steering device of claim 3, wherein a phase delay length of a phase shifter provided at one of two branches of a splitter provided on a first split point is $L_n$, wherein $n=2^{M-1}+1$.

6. The beam steering device of claim 1, wherein the plurality of phase shifters delay a phase of light passing through a certain region of the optical waveguide by changing a refractive index of the certain region according to an input signal.

7. The beam steering device of claim 6, wherein the plurality of phase shifters comprise heaters configured to be electrically heated to heat the certain region.

8. The beam steering device of claim 7, wherein lengths of the heaters in directions of a plurality of optical paths are proportional to the phase delay lengths of the plurality of phase shifters.

9. The beam steering device of claim 6, wherein each of the plurality of phase shifters comprises two electrodes configured to apply voltage to opposite ends of the certain region to change a carrier concentration of the certain region.

10. The beam steering device of claim 9, wherein a length of one of the two electrodes of each of the plurality of phase shifters in a direction of the optical path is proportional to a phase delay length of each of the plurality of phase shifters.

11. The beam steering device of claim 1, further comprising:
   a first optical amplifier configured to amplify an input optical signal, the first optical amplifier being provided at an input terminal of the optical waveguide; and second optical amplifiers configured to amplify output optical signals and transmit the amplified output optical signals to the plurality of output terminals, the second optical amplifiers being provided between the plurality of output terminals and the plurality of splitters configured to split light.

12. The beam steering device of claim 1, wherein the light source is configured to emit light toward the optical waveguide.

13. The beam steering device of claim 12, wherein the light source, the optical waveguide, and the plurality of phase shifters are integrated on one silicon substrate.

14. A light detection and ranging (LiDAR) device comprising:
   a light source;
   a beam steering device configured to steer light from the light source at a predetermined angle and output the steered light, wherein the beam steering device comprises:
      an optical waveguide configured to split input light into a plurality of split light along a plurality of paths, and output the plurality of split light to a plurality of output terminals which are aperiodically arranged,
      a plurality of phase shifters provided in the plurality of paths, wherein at least two phase shifters among the plurality of phase shifters have different phase delay length,
      a signal input unit configured to supply a uniform signal to each of the plurality of phase shifters, and
      splitters configured to split the input light into two branches of light,
      wherein the optical waveguide is configured to provide an optical path through which the input light is split M times in a full binary tree structure, and has $(2^M-1)$ split points and $2^M$ output terminals, wherein M represents an integer greater than or equal to 1,
      wherein the splitters are respectively arranged at one of the $(2^M-1)$ split points, and
      wherein each of the plurality of phase shifters is arranged at only one of two branches of each of the splitters;
   a receiver configured to receive the light which is output from the beam steering device and light reflected from an object; and
   a processor configured to control the light source, the beam steering device, and the receiver.

15. The LiDAR device of claim 14, wherein, when a sum $L_1$ of length of phase delay by one or more phase shifters provided in a path facing a first output terminal $OP_1$ is 0, a position $d_1$ of the first output terminal $OP_1$ is 0, and a position of an $i^{th}$ output terminal $OP_i$ is $d_i$, a sum $L_i$ of length of phase delay by one or more phase shifters provided in an $i^{th}$ path among the plurality of paths facing an $i^{th}$ output terminal among the plurality of output terminals satisfies the following condition:

$$\sin\theta = \frac{\lambda c L_i}{2\pi d_i},$$

wherein $\lambda$ is a wavelength of incident light, $\theta$ is a steering angle, and c is a real number which is not 0,
wherein i represents an integer from 1 to $2^M$.

16. The LiDAR device of claim 14, wherein the light source, the beam steering device, and the receiver are integrated on one silicon substrate.